(12) United States Patent
Jones

(10) Patent No.: US 7,462,097 B2
(45) Date of Patent: Dec. 9, 2008

(54) SUPPORT DEVICE FOR CLEANING FISH AND GAME ANIMALS

(76) Inventor: John P. Jones, 21271 Indian Woods Trail, Courtland, VA (US) 23837

( * ) Notice: Subject to any disclaimer, the term of this patent is extended or adjusted under 35 U.S.C. 154(b) by 922 days.

(21) Appl. No.: 10/924,623

(22) Filed: Aug. 24, 2004

(65) Prior Publication Data

US 2006/0046630 A1    Mar. 2, 2006

(51) Int. Cl.
A22B 1/00    (2006.01)
(52) U.S. Cl. .................................................. 452/185
(58) Field of Classification Search ............... 452/185, 452/186, 194–196, 198; 43/65, 21.2, 25, 43/17.2; 269/54, 296, 302.1, 289, 292–294, 269/900, 53, 54.1–54.5; 211/13.1, 85.4, 211/85.7, 85.11
See application file for complete search history.

(56) References Cited

U.S. PATENT DOCUMENTS

| | | | |
|---|---|---|---|
| 94,076 A | 8/1869 | Chambers | |
| 143,401 A | 10/1873 | Brenner | |
| 508,711 A | 11/1893 | Hilsher | |
| 511,238 A | 12/1893 | Hietzman | |
| 911,079 A | 2/1909 | Smith | |
| 943,767 A * | 12/1909 | Bullard | 269/54.5 |
| 1,259,109 A | 3/1918 | Kugler et al. | |
| 1,530,675 A | 3/1925 | Janes | |
| 1,614,346 A | 1/1927 | Daley | |
| 1,693,761 A * | 12/1928 | Macripo | 269/54.5 |
| 1,890,907 A * | 12/1932 | Hoover | 99/419 |
| 2,066,822 A * | 1/1937 | Cohen | 211/13.1 |
| 2,117,447 A | 5/1938 | Paloni | |
| 2,741,061 A * | 4/1956 | Harrison | 43/53.5 |
| 2,795,813 A | 6/1957 | Brandewie | |
| 3,199,820 A | 8/1965 | Thompson | |
| 3,740,794 A | 6/1973 | Smith | |
| 3,833,967 A | 9/1974 | Kieser | |
| 3,945,083 A * | 3/1976 | Heightshoe | 452/187 |
| 4,054,968 A | 10/1977 | Statz | |
| 4,094,041 A | 6/1978 | Steed | |
| 4,150,460 A | 4/1979 | Clark | |
| 4,193,495 A * | 3/1980 | Keeley | 294/143 |
| 4,543,688 A | 10/1985 | Barchus | |
| 4,615,077 A | 10/1986 | Beebe | |
| 4,620,386 A | 11/1986 | Hare | |
| 4,625,363 A | 12/1986 | Watson | |

(Continued)

FOREIGN PATENT DOCUMENTS

EP    0 258 941 A2    3/1988

*Primary Examiner*—Thomas Price
(74) *Attorney, Agent, or Firm*—Timothy M. Barlow

(57) ABSTRACT

A one-piece support device for cleaning, skinning or filleting fish or game provides a secure support for fish or game. The support includes a sturdy base which attaches rigidly to a generally vertical structure. Vertical prongs extend upward from the base to engage the fish or small game. The device may also include a stabilizing element which extends from the lower portion of the base. The lower portion of the base may include a barbed prong for smaller fish or game. The fish or game is hung from the vertical prongs and is held substantially stationary in a preferred orientation, without twisting, by the stabilizing element and one or more prongs. The fish or game may safely be cleaned, skinned or filleted, using both hands, without worry of the fish or game moving.

20 Claims, 8 Drawing Sheets

U.S. PATENT DOCUMENTS

| | | |
|---|---|---|
| 4,656,693 A | 4/1987 | Brooks |
| 4,759,101 A | 7/1988 | Hyatt |
| 4,965,958 A | 10/1990 | Cedergreen et al. |
| 4,977,643 A | 12/1990 | Prysock |
| 5,100,365 A | 3/1992 | Johnson |
| 5,294,005 A * | 3/1994 | Hedges .................. 211/85.7 |
| 5,474,491 A * | 12/1995 | Koch ..................... 452/165 |
| 5,580,037 A * | 12/1996 | Gore ..................... 269/54.5 |
| 5,626,513 A | 5/1997 | Curtis |
| 5,626,514 A | 5/1997 | Rothove |
| 6,126,126 A | 10/2000 | McKieman, Jr. |

* cited by examiner

SUPPORT DEVICE FOR CLEANING FISH AND GAME ANIMALS

BACKGROUND OF THE INVENTION

1. Field of the Invention

The present invention relates to devices for supporting live or dead fish of all sizes and small game animals during cleaning. In particular, the present invention relates devices for supporting fish of all sizes and small game animals during cleaning, skinning and filleting.

2. Description of the Related Art

Fishermen and hunters face numerous challenges when cleaning, skinning and filleting fish and small game animals, particularly fish and animals with teeth, claws, barbs, whiskers, spines or horns. All fish can be slippery and generally move quite a bit when the cleaning process is started, particularly when they are still alive. Fish with barbs, spines or horns can cause injury to the person cleaning the fish when they are able to move excessively. Further, it is physically difficult to hold large fish in a convenient location during cleaning, skinning in filleting due to the weight of the fish.

Several devices have been produced to ease the difficulties encountered by fisherman and hunters. These include various types of hooks and holding devices with non-optimally-oriented hooks, moving parts, or single mounting and support mechanisms that do nothing to control a swinging and twisting fish.

Each of the patented devices listed below has at least one major shortcoming. Some of them cannot be rigidly mounted to a wall or tree or other surface without extensive modification. Some of them do not prevent a fish or small game animal from twisting during the cleaning process, whether the animal is alive or dead. Those devices require that the user dedicate one hand to stabilize the animal for proper cleaning. Thus, the user cannot effectively devote both hands to the cleaning process. Another shortcoming is the use of moving parts, or one-piece devices designed to flex or spring. The lack of rigidity is a potential safety hazard when working with slippery animals and sharp points and knives.

U.S. Pat. No. 94,076, issued to A. J. Chambers, et al., discloses an Improvement in Hog-Elevator. The device includes a ratchet, pulleys and other moving parts.

U.S. Pat. No. 143,401, issued to Moses Brenner, discloses a Slaughtering Apparatus. The device does include a pair of hooks for supporting an animal, but the hooks are mounted on tracks to move between cooling chambers of the device.

U.S. Pat. No. 508,711, issued to Ellen Hilsher, discloses a Kitchen Utensil. The device includes a plurality of single hooks for supporting a plurality of fish for cooking operations. No provision is made for cleaning fish.

U.S. Pat. No. 511,238, issued to A. H. Hietzman, discloses a Meat Hanger. The device is a large spring with a single loop for supporting the device, and a pair of points for entering a block of meat from opposite sides.

U.S. Pat. No. 911,079, issued to J. L. Smith, discloses a Gambrel Hook. The device has a single, pivoting support point and two adjustable, coplanar, oppositely-pointing hooks.

U.S. Pat. No. 1,259,109, issued to H. Kugler and J. Bauer, discloses a Fish Dressing Device. The device has an adjustable chain-mounted fish hook and a complex fishtail clamp assembly to keep fish flat.

U.S. Pat. No. 1,530,675, issued to Clarence Janes, discloses a Collapsible Animal Skinning Support. The device has a single, pivoting suspension point and several moving parts.

U.S. Pat. No. 1,614,349, issued to James Daley, discloses a Meat Hanger. The device includes moving parts connected by a hinge mechanism.

U.S. Pat. No. 2,117,447, issued to Dominic Paloni, discloses a Meat Lifter. The device has two moving parts attached at a pivot. The points are arranged to pierce a block of meat from opposite sides. There is no provision for cleaning fish or game.

U.S. Pat. No. 2,795,813, issued to Leo Brandewie, Discloses a Fish and Game Holding Device. The device includes several moving parts including a clamp for holding fish.

U.S. Pat. No. 3,199,820, issued to William Thompson, discloses a Support Hanger for Fish, Game and the Like. The device includes a single attachment point for mounting to a wall or tree and a single, pivoting hook to hold a fish.

U.S. Pat. No. 3,740,794, issued to George Smith, discloses a Fish Fillet Aid. The device includes several moving parts including a clamp for holding fish.

U.S. Pat. No. 3,833,967, issued to Lester Kieser, discloses a Fish Cleaning Board. The device includes a sliding clamp and support for holding fish.

U.S. Pat. No. 4,054,968, issued to Wilbert Statz, discloses a Small Game Holder. The device is a freestanding unit with a horizontal base plate. It has a plurality of perpendicularly connected, vertical panels with teeth for engaging fish and a window opening in a vertical panel. It is anchored in place with a horizontal panel that the user kneels upon to prevent movement.

U.S. Pat. No. 4,094,041, issued to Earl Steed, discloses a Dressing Holder for Small Game. The device is attached at a single suspension and mounting point. It requires a diamond-shaped frame and a neck-support loop for small game.

U.S. Pat. No. 4,150,460, issued to V. Doyne Clark, discloses a Fish Holder With Rotatable Clamping Jaws. The device includes several moving parts including a pair of clamping jaws for holding fish.

U.S. Pat. No. 4,543,688, issued to Oscar Barchus, discloses an Animal Skinning Holder. The device includes some movable ratchet jaws for holding game animals. There is no provision for cleaning fish.

U.S. Pat. No. 4,615,077, issued to Jay W. Beebe, discloses a Game Skinning Aid. The device has no back or support plate and is supported at a single point by its wire frame.

U.S. Pat. No. 4,620,386, issued to Larry Hare, discloses a Method and Apparatus for Gripping a Fish. The device includes a pair of jaws similar to a set of kitchen tongs, but with serrated edges and a pair points bent at 90 degrees. It does not allow for hands free use and is limited to use with small fish U.S. Pat. No. 4,625,363, issued to Talmadge Watson, discloses a Squirrel Skinning Apparatus. The device includes three slots for engaging a squirrel's torso and legs. No provision for cleaning fish is disclosed.

U.S. Pat. No. 4,656,693, issued to Paul Brooks, discloses a Game Skinner. The device is constructed of wire and includes a pair of spikes for piercing an animal's legs and a wire loop for holding an animal's head. There is no provision for cleaning fish.

U.S. Pat. No. 4,759,101, issued to Billy Hyatt, discloses an Apparatus For Holding Small Game Animals Or Fish During Skinning, Scaling Or Butchering Operations. The device is attached to a single suspension point and not rigidly mounted. It requires a multi-part, serrated jaw mechanism with several moving parts as well.

U.S. Pat. No. 4,965,958, issued to Stephen Cedergreen et al., discloses a Fish Holder. The device is a handheld, spring-loaded clamp with jaws for grabbing a fish.

U.S. Pat. No. 4,977,643, issued to Arnold Prysock, discloses a Fish Skinning Device, and Methods of Constructing and Utilizing Same. The device includes multiple mounting members and a single hook supported from a chain.

U.S. Pat. No. 5,100,365, issued to Ronald Johnson, discloses a Game Support Rack. The device has a single suspension and mounting point and requires a triangular frame, and internally-threaded support boss and a threaded mounting spike to attach the device to a supporting structure.

U.S. Pat. No. 5,626,513, issued to James Curtis, discloses a Clamping Device During Skinning of a Fish. The device is a handheld, spring-loaded clamp with pronged jaws for holding a fish.

U.S. Pat. No. 5,626,514, issued to Herman Rothove, discloses a Small Game Skinning Device. The device includes several moving parts including a ratchet and cable for removing skin from an animal.

U.S. Pat. No. 6,126,126, issued to Robert McKieman, Jr., discloses a Tack With Three Prongs. The device has three horizontal or downward facing points for engaging a fabric-covered cubicle wall. Once mounted to a wall a hook is used to hang items, such as a clipboard.

European Patent No. EP0258941A2 discloses a Method And Apparatus For Cleaning Round Fish, Including Especially Mechanical Removal Of Gut From Fish. The device includes several moving parts for holding a fish for cleaning.

Therefore, there has been and continues to be a need for an easy-to-use, practical fish holder which allows safe, hands free use and maintains the fish and small game animals in a preferred stationary vertical orientation. Such a device prevents a fish from twisting and simplifies skinning, cleaning and filleting of live or dead fish of all sizes while reducing the risk of injury to the fisherman. It should have not moving parts and should be impervious to the elements.

SUMMARY OF THE DISCLOSURE

A support device for fish, in particular, large live fish, is described which includes a base member which is attachable to a structure such that the base is rigidly held in a fixed position. The base can be attached to the structure by any means such as bolts, nails or screws. At least two vertical prongs are attached to the base, by, for example, welding, such that the prongs remain stationary when supporting fish in a stationary vertical orientation. The proximal ends of the vertical prongs attached to the base are preferably wider than the distal ends of the vertical prongs. The distal ends of the vertical prongs are also preferably tapered to enter the gills of the fish and extend through the mouth of the fish. A stabilizing element may also be attached to the base to prevent the fish from twisting or moving while on the device. The stabilizing element is preferably attached to the base below the vertical prongs. The stabilizing element may also include an additional vertical prong which may have a barbed distal end. Preferably, the barbed distal end is tapered towards the base to reduce the chance of injury to the device user. The support device is preferably made from or coated with a water resistant material such as iron, steel, Teflon, a composite, aluminum or plastic.

It is therefore an object of the present invention to provide a device for holding fish during cleaning, skinning and filleting which holds the fish in a preferred stationary vertical orientation.

It is another object of the present invention to provide a device for holding live fish during cleaning, skinning and filleting.

It is another object of the present invention to provide a device for holding fish during cleaning, skinning and filleting which protects against injuries caused by the fish.

It is yet another object of the present invention to provide a device for holding fish during cleaning, skinning and filleting which is designed for hands free use.

It is yet a further object of the present invention to provide a device for holding fish during cleaning, skinning and filleting which is suitable for handling very large fish.

It is yet another object of the present invention to provide a device for holding fish during cleaning, skinning and filleting which prevents a fish from twisting.

It is yet another object of the present invention to provide a device for holding fish during cleaning, skinning and filleting which has no moving parts.

It is yet another object of the present invention to provide a device for holding fish during cleaning, skinning and filleting which does not shift or flex significantly during use.

Finally, it is an object of the present invention to accomplish the foregoing objectives in a simple and cost effective manner.

Figure 1:
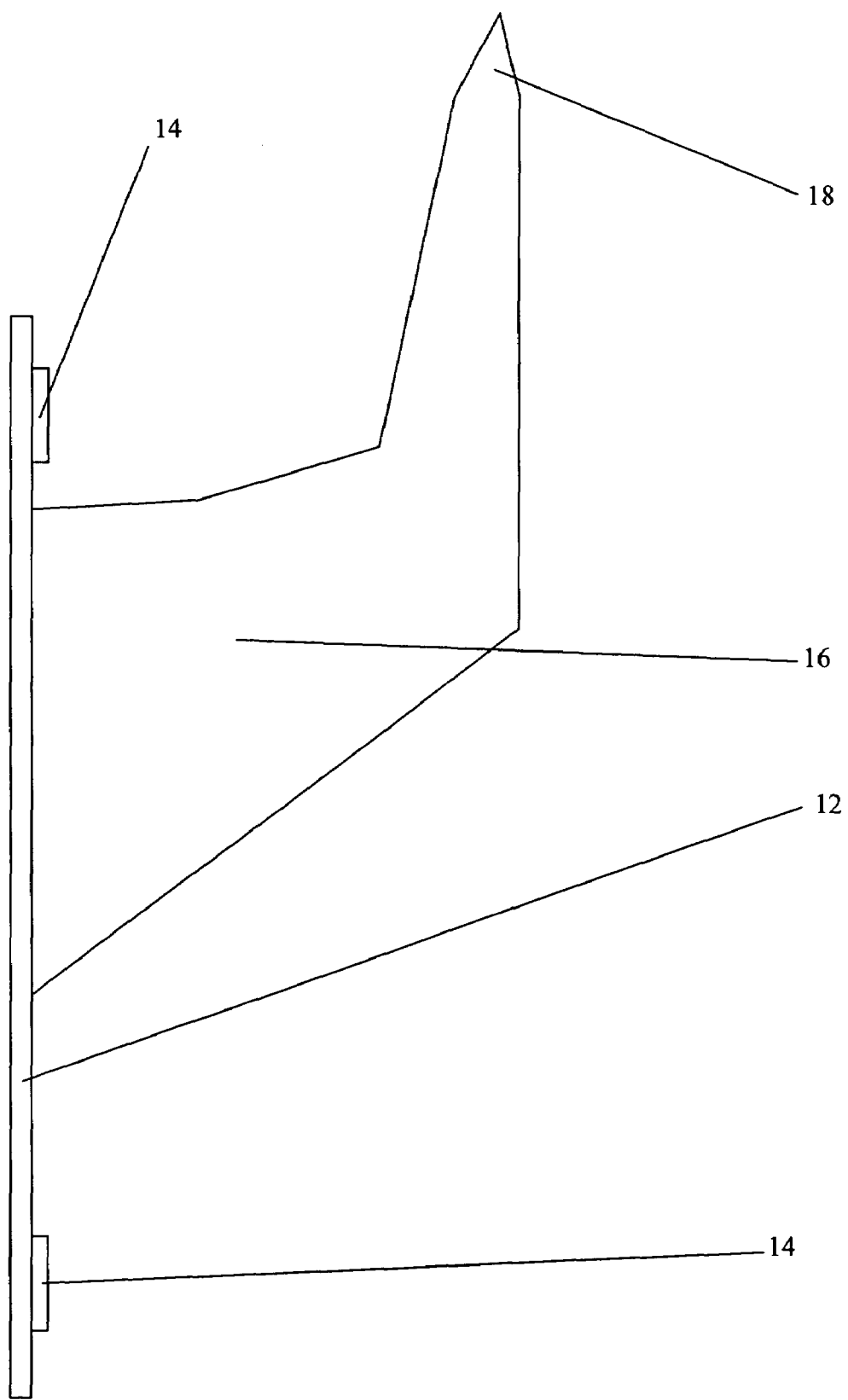
FIG. 1 is a side view of a preferred embodiment of the present invention.

ELEMENT LIST 12 base
14 bolt
16 vertical prong
18 distal end
20 stabilizing element
22 barbed prong

DETAILED DESCRIPTION OF THE PREFERRED EMBODIMENT

The following detailed description is of the best presently contemplated modes of carrying out the invention. This description is not to be taken in a limiting sense, but is made merely for the purpose of illustrating general principles of embodiments of the invention.

The present invention provides a device for holding live or dead fish of any size and small game animals during cleaning, skinning and filleting which is easy to use, protects against injury from the fish and which is suitable for cleaning large fish. The device is mounted on a sturdy surface and includes an arrangement of pronged hooks for supporting the fish in a stationary vertical orientation. Depending on its size, the fish is mounted on one or more of the prongs for cleaning, skinning or filleting and is held in place, incapable of twisting.

Figure 2:
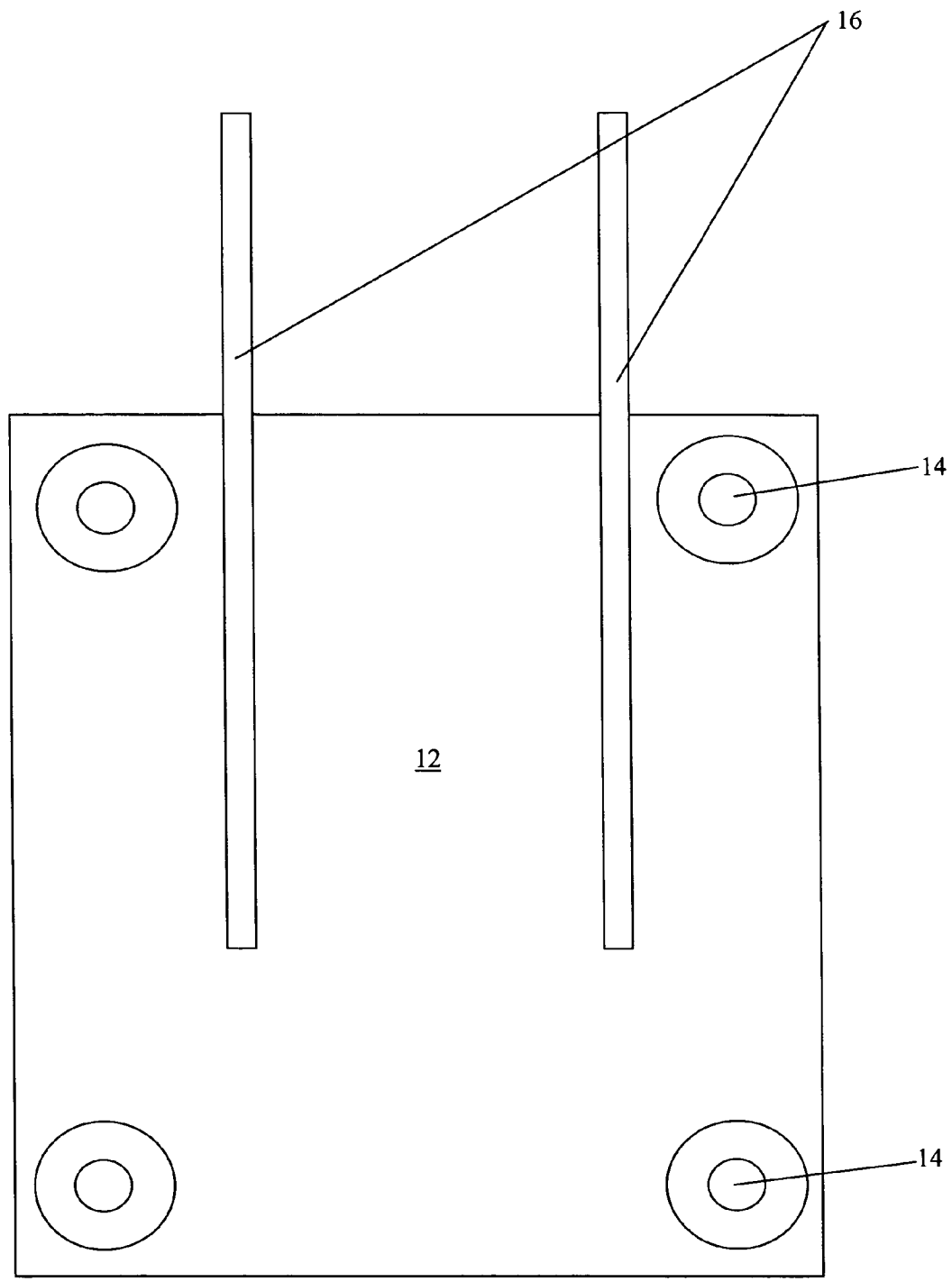
FIG. 2 is a front view of a preferred embodiment of the present invention.

A preferred embodiment of the device is shown in the accompanying figures. FIGS. 1 and 2 show the preferred embodiment of the present invention. The base 12 is generally rectangular in shape although other shapes can be used. The base 12 is preferably made from a durable, water resistant material such as steel, composites, iron, aluminum or plastics. Alternatively, the device may be coated with a durable, water-resistant material. The material must be sufficiently durable to hold the fish which will be cleaned, skinned or filleted, and rigid enough to resist flexing under the load and the fish cleaning procedure. The base 12 preferably measures 8 inches (20.3 cm) in length, 6 inches (15.2 cm) in width and ¼ inch (0.6 cm) in thickness. The overall size of the device can vary based on the size of fish. The device may be scaled to meet the needs of particular groups of sportsmen. The base 12 is attached to a sturdy surface such as a wall, tree or pole using bolts 14. A single bolt 14 would permit the device to shift or rotate about the bolt's longitudinal axis. At a minimum, the device should be mounted using a pair of bolts 14 with large heads or load-distributing washers to prevent the device from rocking about the axis of the two mounting bolts 14. Three or more bolts 14 attached around the perimeter of the base 12 would prevent excess motion. Other attachment means which prevent the base 12 from moving are acceptable.

The vertical prongs 16 are connected to the base 12 by a sturdy attachment means such as welding. Alternatively, if a molding process is used, the vertical prongs 16 may be formed as part of the base 12. The vertical prongs 16 are normally made from the same material as the base 12 but this is not absolutely necessary so long as a sturdy connection can be made between the vertical prongs 16 and the base 12. The vertical prongs 16 are mounted such that they are substantially parallel to each other and preferably about 2½ inches (6.3 cm) apart. The proximal ends of the prongs 16 are preferably about 4 inches (10.2 cm) wide. The vertical prongs 16 extend horizontally for a short distance and taper to a smaller width, preferably about 1¾ inches (4.4 cm). The vertical prongs 16 then turn to a vertical orientation and taper again to a smaller width ending at a point at the distal end 18. It is particularly preferred for the distal ends 18 of the vertical prongs 16 to be tapered inward or pointing back towards the base 12. The overall length of the vertical prongs 16 is preferably about 10 inches (25.4 cm) and the thickness is preferably about ¼ inch (0.6 cm).

The vertical prongs 16 are specifically designed to slide into and flare the gills of the fish. Further, the vertical prongs 16 extend a sufficient distance into the flared gills such that the vertical prongs 16 extend through the mouth of the fish. The vertical prongs 16 may be used singly or in pairs depending on the size of the fish. The design of the vertical prongs 16 ensures that live fish are retained on the device even in the event the fish moves a significant amount. This design prevents the fish from twisting and also retains the fish in a desired stationary vertical orientation to facilitate cleaning, skinning and filleting. Because the fish is held securely and stationary, the chance of injury to the person cleaning the fish is significantly reduced.

Figure 3:
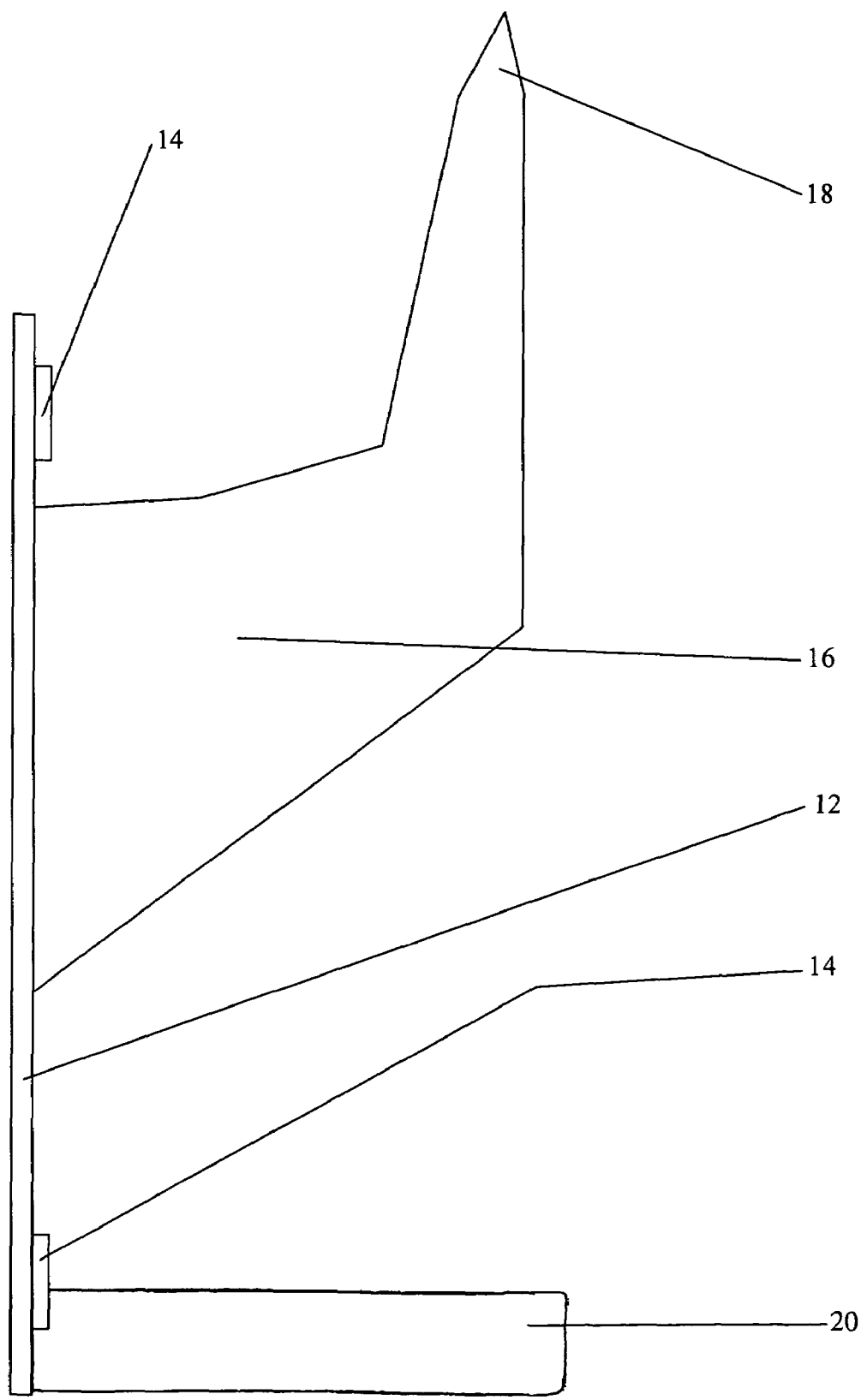
FIG. 3 is a side view of a preferred embodiment of the present invention.
Figure 4:
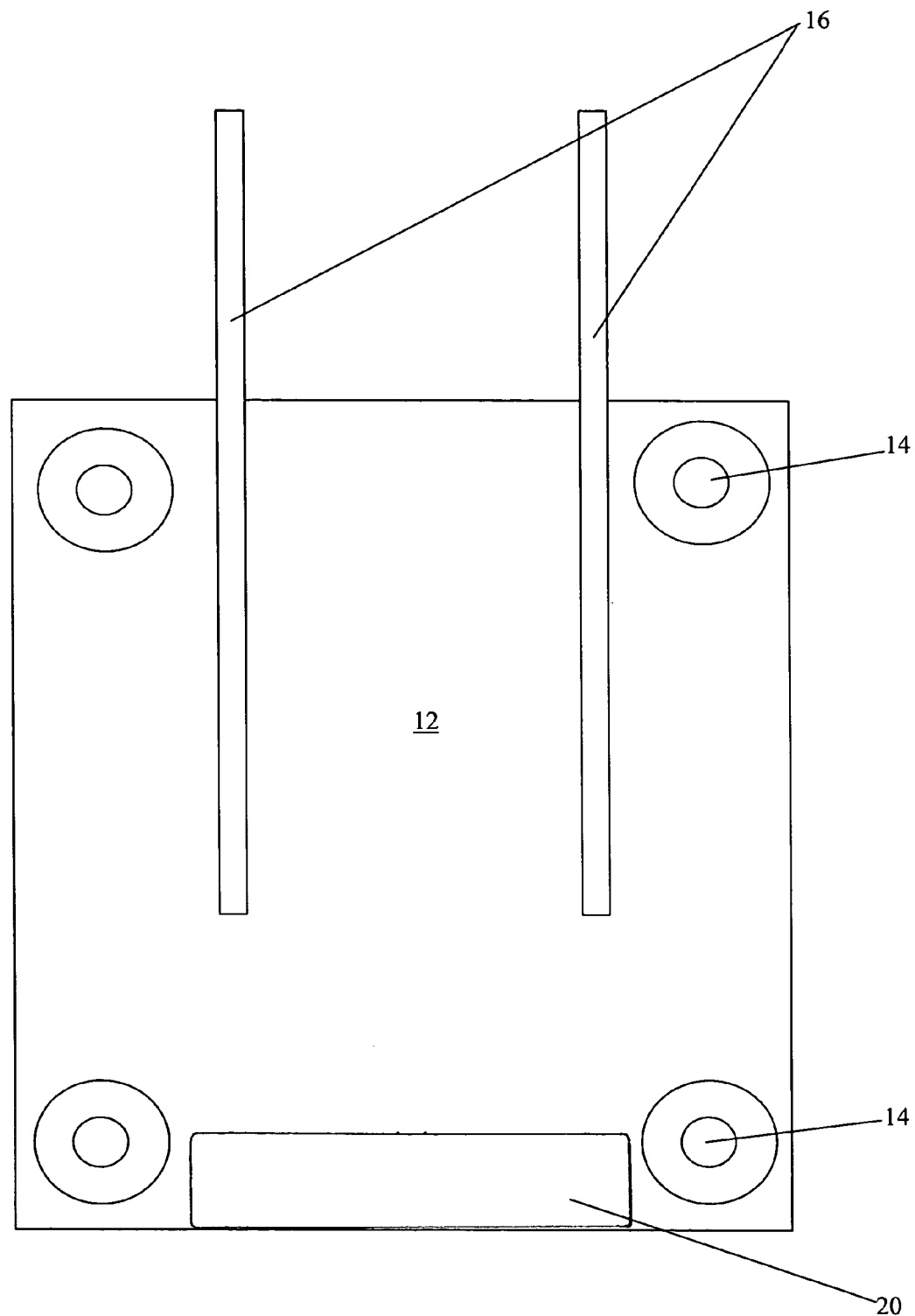
FIG. 4 is a front view of a preferred embodiment of the present invention.

FIGS. 3 and 4 show a particularly preferred embodiment of the present invention. In addition to the elements described previously, a stabilizing element 20 is attached to the base 12. The stabilizing element 20 is preferably made from the same material as the base 12 but may be any appropriate, durable water resistant material so long as a sturdy connection can be made between the stabilizing element 20 and the base 12. As described above for the vertical prongs 16, the stabilizing element 20 may be welded to the base 12 or may be molded in conjunction with the base 12. The stabilizing element 20 is preferably attached to the lower, central portion of the base 12. The stabilizing element 20 preferably measures about 4⅜ inches (11.1 cm) wide, 1 inch (2.54 cm) high and 4⅜ inches (11.1 cm) deep. The stabilizing element 20 provides a stabilizing surface for the fish to rest against and provides additional protection against twisting or turning of the fish.

Figure 5:
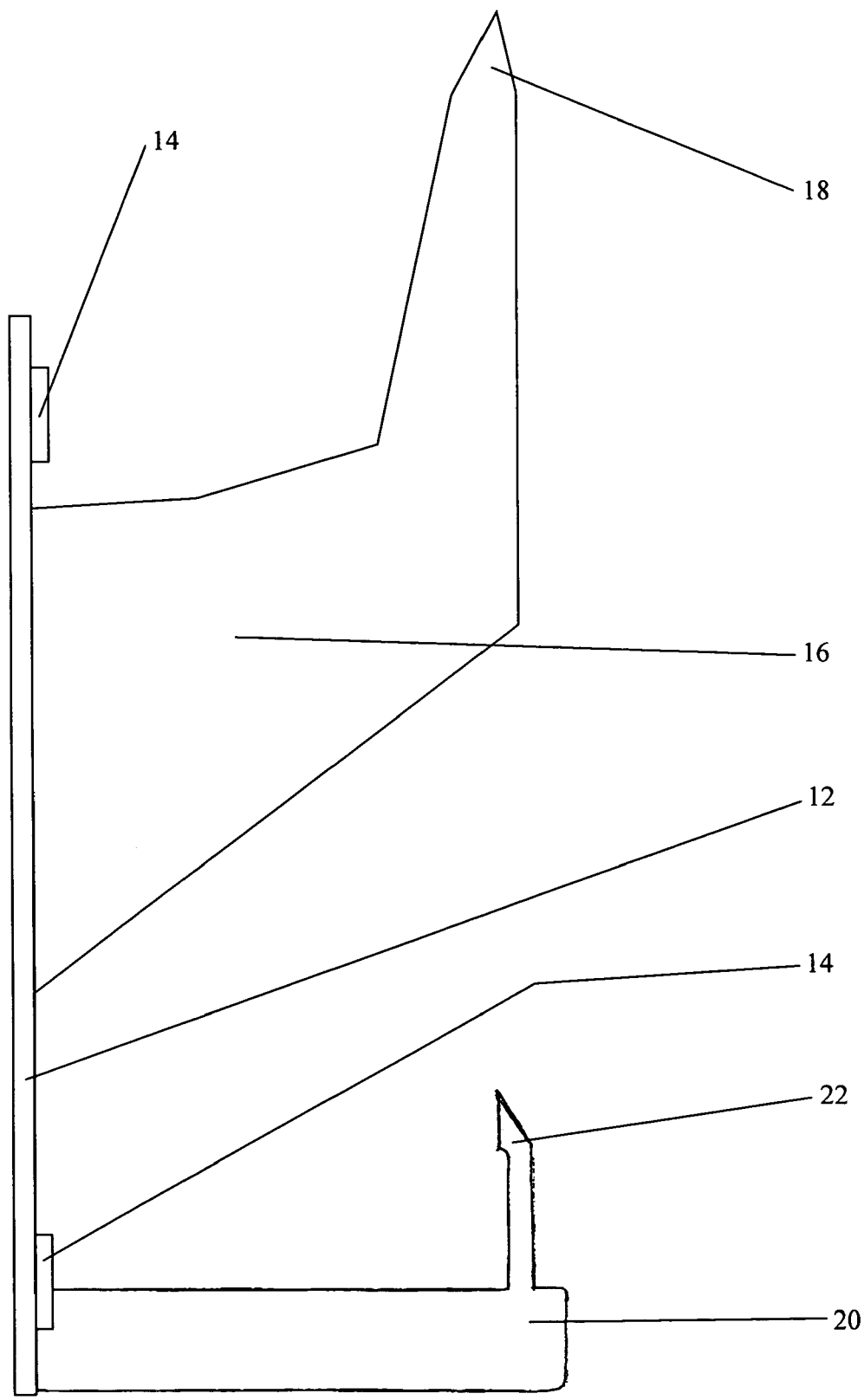
FIG. 5 is a side view of a preferred embodiment of the present invention.
Figure 6:
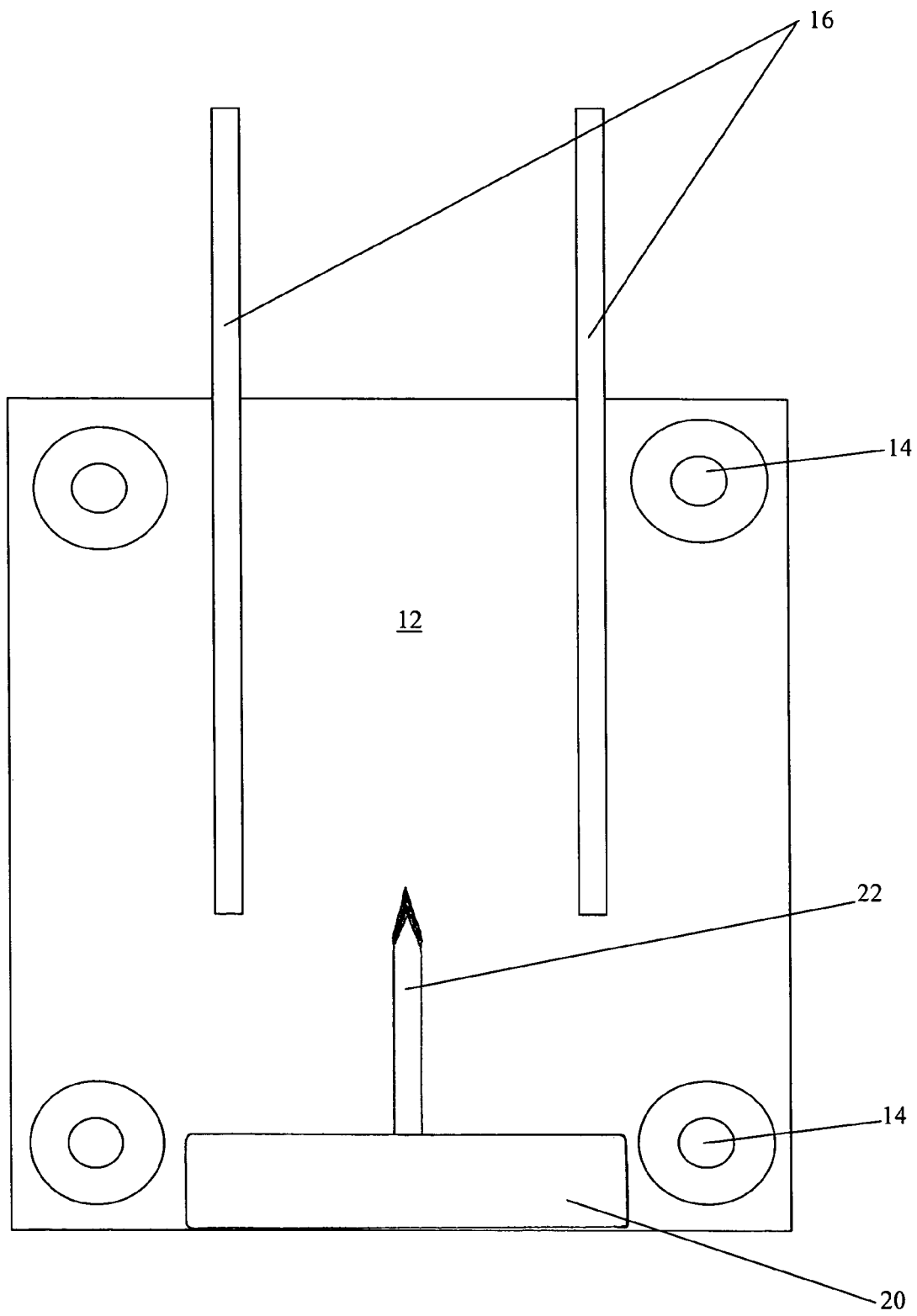
FIG. 6 is a front view of a preferred embodiment of the present invention.

FIGS. 5 and 6 show an especially preferred embodiment of the present invention. In addition to the elements described previously, the stabilizing element 20 includes a barbed vertical prong 22 extending therefrom. Again, this barbed prong 22 is preferably made from the same material as the base 12 but may be any appropriate, durable water resistant material so long as a sturdy connection can be made between the barbed prong 22 and the stabilizing element 20. As described above for the vertical prongs 16, the barbed prong 22 may be welded to the stabilizing element 20 or may be molded in conjunction with the stabilizing element 20 and/or base 12. The barbed prong 22 extends upward from the stabilizing element 20 and is preferably about 2 inches (5.1 cm) long, ¼ (0.6 cm) inch wide and ¼ (0.6 cm) inch thick. In a particularly preferred embodiment, the distal end of the barbed prong 22 tapers inward towards the base 12 to reduce the chance of injury to the user. In conjunction with the barbed prong 22, the stabilizing element 20 provides a stabilizing surface for the fish to rest against and provides additional protection against twisting or turning of the fish.

Use of the Invention

Figure 7:
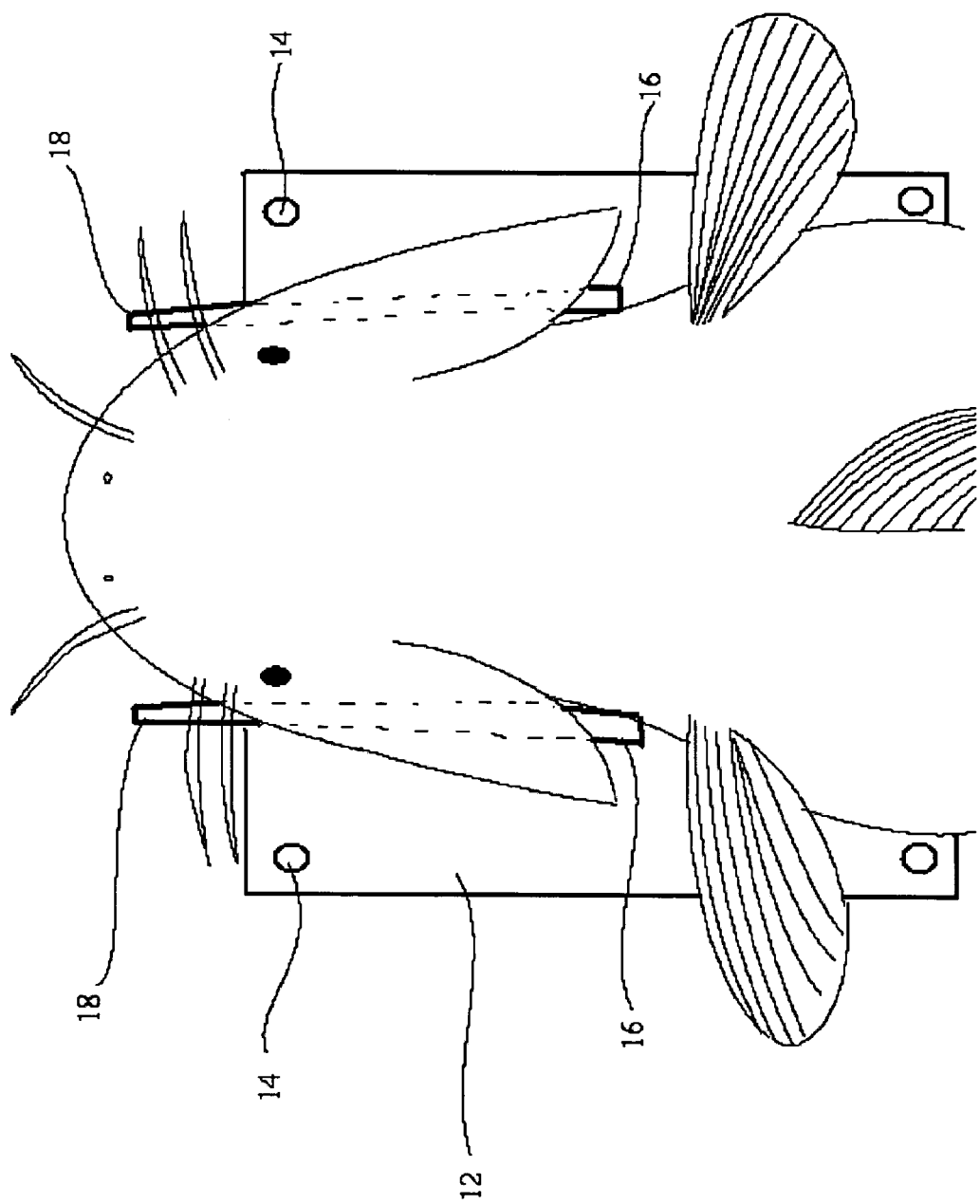
FIG. 7 is a perspective view showing use of the preferred embodiment of the present invention.

The preferred embodiment of the present invention is used in the following manner. The two vertical prongs 16 are used as shown in FIG. 7. With specific reference to a large (over 10 lbs) catfish, the fish is held vertically between the two vertical prongs 16 with the gill plates above the distal end 18 of the vertical prongs 16. The vertical prongs 16 are threaded under the gill plates on each side of the fish and the fish is pulled down until the distal ends 18 of the vertical prongs 16 extend through the fish's mouth. Again, the tapered portion of the vertical prongs 16 enables the vertical prongs 16 to protrude from the fish's mouth rather than stick in the roof of the fish's mouth. The fish is forced down by gravity and is held securely in place by the two vertical prongs 16, in particular by the wide proximal ends of the vertical prongs 16 which act to spread the gills of the fish, and further by the stabilizing element 20.

Figure 9:
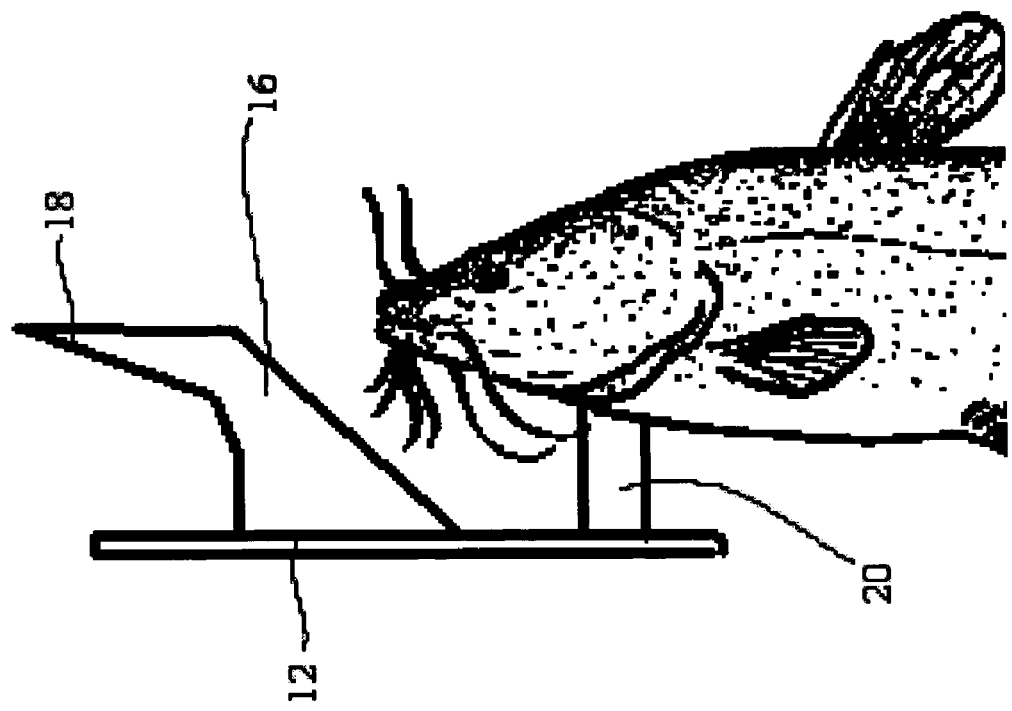
FIG. 9 is a perspective view showing use of an alternate embodiment of the present invention.
Figure 8:
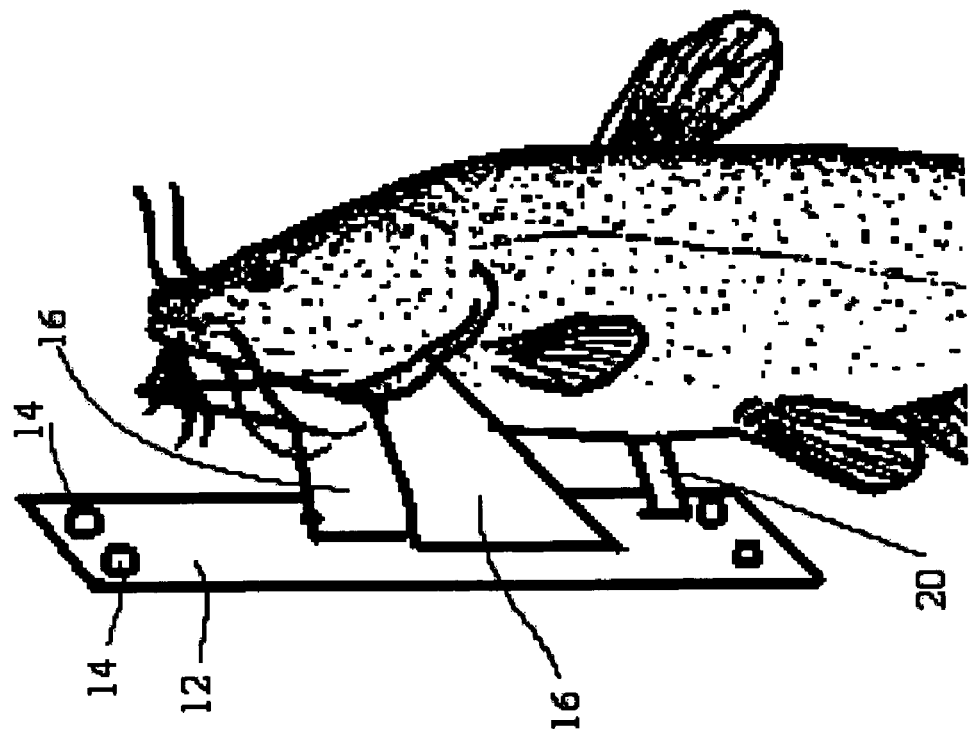
FIG. 8 is a perspective view showing use of an alternate embodiment of the present invention.

In the case of a small fish, the fish is hung from the appropriate vertical prongs 16. As shown in FIGS. 8 and 9, a small fish under approximately ten lbs may be hung from one vertical prong 16 while a small fish under approximately five pounds may be hung from the barbed prong 22. The vertical prong 16 is threaded under the gill plate of the fish and the fish is pulled down until the vertical prong 16 extends from the mouth of the fish. The tapered distal end of the vertical prong 16 allows the vertical prong 16 to pass through the mouth rather than having the point protrude into the roof of the fish's mouth. The broad proximal end of the vertical prong fills the gill plate and prevents the fish from twisting. For smaller fish, the barbed prong 22 is pierced through the bottom, top or both lips of the fish. The fish then hangs from the prong 16 or 22 and is held in the appropriate orientation by resting against the stabilizing element 20.

The device is rigidly mounted to the support wall, post or tree. The device holds the fish against twisting and supported away from the base. The sportsman thus has both hands free to perform skinning and filleting procedures. The fish will not twist away even when the sportsman uses his weight to pull off skin. The skinning and cleaning process is made much safer.

While the description above refers to particular embodiments of the present invention, it will be understood that many modifications may be made without departing from the spirit thereof. In particular, although the device is specifically designed and described as having utility for cleaning, skinning and filleting large, live fish, it can also be used with small fish, dead fish or even, other types of wild game. The accompanying claims are intended to cover such modifications as would fall within the true scope and spirit of the present invention.

What is claimed is:

1. A one-piece support device for a fish, comprising:
   a base member attachable to a generally vertical structure such that the base is rigidly held in a fixed, generally vertical position; and
   at least two vertical prongs attached to the base such that the prongs remain stationary when supporting the fish said vertical prongs having distal and proximal ends, wherein the distal ends of the vertical prongs enter the gills of the fish and extend through the mouth of the fish to retain the fish in a stationary vertical position, wherein the fish cannot twist from the stationary vertical position and the sportsman can use both hands to safely skin or clean the fish.

2. The support device for fish as set forth in claim 1 further comprising a stabilizing element attached to the base.

3. The support device for fish as set forth in claim 2 wherein the stabilizing element is attached to the base below the vertical prongs.

4. The support device for fish as set forth in claim 2 wherein the stabilizing element includes a vertical prong.

5. The support device for fish as set forth in claim 2 wherein the vertical prong on the stabilizing element includes a barbed distal end.

6. The support device for fish as set forth in claim 5 wherein the barbed distal end is tapered towards the base.

7. The support device for fish as set forth in claim 1 wherein the vertical prongs are attached to the base such that the prongs are in substantially parallel relationship to each other.

8. The support device for fish as set forth in claim 1 wherein the distal ends of the vertical prongs are tapered.

9. The support device for fish as set forth in claim 1 wherein the proximal ends of the vertical prongs are wider than the distal ends of the vertical prongs.

10. The support device for fish as set forth in claim 1 wherein the base and vertical prongs are made from a water resistant material.

11. The support device for fish as set forth in claim 1 wherein the base and vertical prongs are made from a material selected from the group consisting of iron, steel, Teflon, composites, aluminum and plastics.

12. The support device for fish as set forth in claim 1 wherein the vertical prongs are welded to the base.

13. The support device for fish as set forth in claim 1 wherein the base is attached to the structure using two or more attachments selected from the group consisting of bolts, nails and screws.

14. A support device for fish, comprising:
    a base member attachable to a structure such that the base is rigidly held in a fixed position;
    at least two vertical prongs attached to the base in substantially parallel orientation such that the prongs remain stationary when supporting fish, said vertical prongs having distal and proximal ends wherein the distal ends of the vertical prongs are tapered to enter the gills of the fish and extend through the mouth of the fish and wherein the proximal ends of the vertical prongs are wider than the distal ends of the vertical prongs; and
    a stabilizing element attached to the base below the vertical prongs wherein the stabilizing element includes a prong having a barbed distal end which distal end is tapered towards the base.

15. The support device for fish as set forth in claim 14 wherein the base, vertical prongs and stabilizing element are made from a water resistant material.

16. The support device for fish as set forth in claim 14 wherein the base, vertical prongs and stabilizing element are made from a material selected from the group consisting of iron, steel, Teflon, composites, aluminum and plastics.

17. The support device for fish as set forth in claim 14 wherein the vertical prongs are welded to the base.

18. The support device for fish as set forth in claim 14 wherein the base is attached to the structure using attachments selected from the group consisting of bolts, nails and screws.

19. A one-piece support device for fish, comprising:
    a base member attachable to a structure using attachments selected from the group consisting of bolts, nails and screws such that the base is held in a fixed position;
    at least two vertical prongs welded to the base in substantially parallel orientation such that the prongs remain stationary when supporting fish, said vertical prongs having distal and proximal ends wherein the distal ends of the vertical prongs are tapered to enter the gills of the fish and extend through the mouth of the fish and wherein the proximal ends of the vertical prongs are wider than the distal ends of the vertical prongs;
    a stabilizing element attached to the base below the vertical prongs wherein the stabilizing element includes a prong having a barbed distal end which distal end is tapered towards the base; and
    wherein the base member, vertical prongs and stabilizing element are made from a water resistant material.

20. The support device for fish as set forth in claim 19 wherein the base, vertical prongs and stabilizing element are made from a water resistant material selected from the group consisting of iron, steel, Teflon, composites, aluminum and plastics.

* * * * *